Patented Feb. 20, 1951

2,542,551

UNITED STATES PATENT OFFICE 2,542,551

1,3,5-TRIS(ISOPROPENYL)BENZENE

Charles H. McKeever, Glenside, and John O. Van Hook, Roslyn, Pa., assignors to Rohm & Haas Company, Philadelphia, Pa., a corporation of Delaware No Drawing. Application November 10, 1949, Serial No. 126,676

4 Claims. (Cl. 260—673.5)

This invention deals with tris(isopropenyl)-benzene and with methods for its preparation.

The reaction of acetone and acetylene in the presence of potassium hydroxide in the presence of oxygenated solvents is known to yield 3-methyl-1-butyn-3-ol. When this triple-bonded alcohol is heated in the presence of acidic catalysts, as is known, there is readily obtained isopropenylacetylene, $CH_2=C(CH_3)-C\equiv CH$, or 2-methyl-1-buten-3-yne.

We have now found that tris(isopropenyl)-benzene is formed by trimerizing 3-methyl-1-butyn-3-ol to form tris(1-methyl-1-hydroxyethyl)benzene and dehydrating this product. Alternatively, tris(isopropenyl)benzene is formed by dehydrating 3-methyl-1-butyn-3-ol to isopropenylacetylene and trimerizing the latter.

Trimerizing is accomplished by heating the methylbutynol or isopropenylacetylene in the presence of a nickel carbonyl-substituted phosphine catalyst at 40° to 120° C. The trimerization is preferably accomplished in an inert, organic solvent, such as benzene, toluene, xylene, petroleum ether, naphtha, or the like.

The perferred catalysts are nickel carbonyl-triphenyl phosphine combinations in which one to two moles of triphenyl phosphine are reacted with one mole of nickel carbonyl. To prepare the catalyst a solution of nickel carbonyl in an inert organic solvent and a triphenyl phosphine, usually also in such a solvent, are mixed within the above proportions. The phosphine is most desirably triphenyl phosphine but other phenyl phosphines may be used, as those with alkylphenyl groups or other neutrally substituted phenyl groups. In place of triphenyl phosphine there may be used triphenyl arsine.

When the two reactants, nickel carbonyl and the triphenyl phosphine, are mixed, carbon monoxide is slowly evolved and a compound is formed which corresponds to the formula $Ni(CO)_{4-x}(MAr_3)_x$, where M is an element of group V-B of the Periodic Table having an atomic weight from 31 to 75, Ar is a phenyl group, and $x$ has a value of one to two.

The catalyst is best used in the solution in which it is prepared. The amount of catalyst required is small, varying from 0.25% to 7.5% of the weight of the methylbutynol or isopropenylacetylene.

When the trimerization reaction has been carried on for sufficient time to ensure good conversion, any solid material present is separated by filtration or allowed to settle and the solution decanted off. At this stage, if so desired, the reaction mixture may be treated with a decolorizing aid, such as a charcoal. The trimer may be separated after distilling off solvent. When methylbutynol is trimerized, a trihydric alcohol is formed which can be crystallized out. This alcohol may also be distilled under reduced pressure, as may likewise tris(isopropenyl)benzene. Unreacted methylbutynol or isopropenylacetylene is recovered.

Tris(1-methyl-1-hydroxyethyl)benzene is readily dehydrated by heating it at 80° to 120° C. with a dehydrating catalyst and removing water. The heating is usually done in the presence of a solvent, such as benzene or toluene, which permits azeotropic distillation and separation of water. As catalyst there may be used an acid catalyst particularly for liquid phase dehydration, including dehydration in the presence of a solvent. Typical acid catalysts include the alkali metal acid sulfates, acidic clays, cation exchange resins in their hydrogen form, such as sulfited phenol-formaldehyde condensates, sulfonated phenol-formaldehyde resins, and sulfonated styrene copolymers, sulfonic acids such as benzene sulfonic acid or p-toluene sulfonic acid, sulfuric acid, hydrobromic acid, hydriodic acid, phosphoric acid, oxalic acid, and the like. Iodine acts like the acid catalysts and for convenience may be considered with them. It is quite effective in promoting the dehydration of tris(1-methyl-1-hydroxyethyl)benzene or of 3-methyl-1-butyn-3-ol to hydrocarbons.

After the hydroxy compound has been dehydrated in the presence of an acid catalyst, the reaction mixture is washed with water and/or an alkaline solution, such as a sodium carbonate or bicarbonate solution. It is then dried and distilled.

Dehydration may also be accomplished in vapor phase. In this case tris(1-methyl-1-hydroxyethyl)benzene or 3-methyl-1-butyn-3-ol is vaporized and passed over a dehydrating catalyst at about 150° to about 300° C. The vapors are condensed and further purified as desired. Suitable catalysts include activated alumina, zinc oxide, activated clays, pumice impregnated with acidic materials such as phosphoric acid or dihydrogen phosphates, acidic silica gels, and the like.

The trihydric alcohol is vaporized and dehydrated at reduced pressure. The methylbutynol can be used at ordinary pressures. Since the isopropenylacetylene formed therefrom boils at a relatively low temperature, the vapors from the catalyst are passed through a trap which is suitably chilled, as with a dry ice-acetone mixture. Dehydration of methylbutynol is preferably accomplished in vapor phase, but may also be accomplished in liquid phase.

The preparation of tris(isopropenyl)benzene through trimerizing 3-methyl-1-butyn-3-ol by heating it in the presence of a nickel carbonyltriphenyl phosphine catalyst to form tris(1-methyl-1-hydroxyethyl)benzene and dehydrating the latter by heating it in the presence of an acidic catalyst at 80° to 120° C. possesses several advantages over the alternate method in which methylbutynol is first dehydrated to isopropenylacetylene. The trihydric alcohol is more readily handled than isopropenylacetylene. The trihydric cyclic alcohol formed by trimerization can be separated from the reaction mixture by crystallization.

The following examples are illustrative of methods for producing tris(isopropenyl)benzene.

Example 1

A mixture of 66 parts by weight of potassium hydroxide of 85% purity and 174 parts of dibutyl acetal was stirred, heated to 150° C., and then cooled to 0° C. Acetylene under a pressure of 13 cm. of mercury was passed into the mixture which was cooled to −10° C. Over a period of one half hour 28 parts of acetone was added thereto. The mixture was kept at −10° to 0° C. for two hours and stirred while the acetylene pressure was maintained. The mixture was brought to 25° C. and stirred at this temperature for an hour. It was then poured onto 100 parts of crushed ice. The resulting organic layer was collected, saturated with carbon dioxide, and fractionally distilled through a packed column. The 3-methyl-1-butyn-3-ol was collected between about 100° C. and 120° C. in a yield of 81%.

There were mixed 168 parts by weight of methylbutynol, 2 parts of catalyst,

$Ni(CO)_2.[(C_6H_5)_3P]_2$ and 400 parts of benzene. The mixture was heated under reflux for 8 hours, the pot temperature being 83° C. It was treated with 10 parts of activated charcoal and filtered hot. The filtrate was partly distilled. It was then cooled and crystals were separated. This product was recrystallized from benzene and then melted at 140°–2° C. It contained by analysis 71.46% of carbon and 9.44% of hydrogen, corresponding thus to tris(1-methyl-1-hydroxyethyl)benzene, for which the corresponding values are theoretically 71.40% and 9.59% respectively.

Additional product was obtained from the filtrate following the separation of the above solid. Unreacted methylbutynol was recovered by distillation of the filtrate.

A mixture of 115 parts of tris(1-methyl-1-hydroxyethyl)benzene, 7.5 parts of sodium bisulfate, 5.7 parts of β-naphthol, and 270 parts of toluene was heated in a vessel having a packed reflux column topped with a water separator. After three hours 89% of the theoretical amount of water had been collected and heating was discontinued. The mixture was cooled and washed with water, with a 1% potassium carbonate solution, and again with water. It was dried over magnesium sulfate and distilled. The desired product was obtained in the fraction taken between 90° and 150° C. at 1.5 mm. pressure. The yield was 64%. The product was identified as tris(isopropenyl)benzene, chiefly as the 1,3,5-form with some of the 1,2,4-form present.

Example 2

The trimerization procedure of Example 1 was followed with 330 parts of methylbutynol, 3 parts of $Ni(CO)_2.[(C_6H_5)_3P]_2$, and 80 parts of benzene. The pot temperature was 86° C. during the heating. The yield of trihydric alcohol was 60%. There was recovered about 50 parts of methylbutynol.

The trimer was dehydrated by the procedure described above except that benzene was used as a solvent. The dehydration reaction was interrupted when 42% of the theoretical quantity of water had been removed. The product was collected at 110°–120° C./0.5 mm. in a yield of 34%, based on the starting material.

Example 3

The procedure of Example 1 was followed except that in place of the sodium bisulfate there was used 2 parts of iodine. After 63% of the theoretical water had been taken off, the dehydration reaction was interrupted and the desired tris(isopropenyl)benzene separated at 110°–150° C./1 mm. in a 57% yield.

In place of sodium bisulfate there may be used other non-volatile acidic agents to promote dehydration, including zinc chloride, p-toluene sulfonic acid, sulfonated phenol-formaldehyde resin in its hydrogen form, aluminum sulfate, or the like. These same catalysts are useful for the dehydrating of methylbutynol to isopropenylacetylene.

Example 4

Methylbutynol was heated with toluene in the presence of sodium bisulfate. Isopropenylacetylene was collected at 34°–36° C.

A mixture of 18 parts of isopropenylacetylene, 1 part of $Ni(CO)_2.[(C_6H_5)_3P]_2$, and 50 parts of petroleum ether, boiling at 60°–70° C., was heated under reflux for three hours. An exothermic reaction occurred early in the heating period, which carried the pot temperature to 66° C. at the end of one hour and fifteen minutes. Refluxing was continued by heating and at the end of three hours the temperature of the mixture was 71° C. The mixture was cooled and filtered. The filtrate was treated with one part of β-naphthol and distilled. At 110°–150° C./1 mm. the fraction obtained was trisisopropenylbenzene, having a refractive index, $n_D^{20}$, of 1.5671.

Repetition of the above procedure with substitution of $Ni(CO)_3.C_6H_5P$ for the above nickel catalyst lead to the same end result. In the same way $Ni(CO)_3.C_6H_5P$ may be used to promote trimerization of methylbutynol with satisfactory results. With $Ni(CO)_2.[(C_6H_5)_3As]_2$ yields are somewhat less than when the catalysts containing triphenyl phosphine are used, but the product obtained is nevertheless the trimer from either methylbutynol or isopropenylacetylene.

Tris(isopropenyl)benzene is an interesting new hydrocarbon which is useful as a chemical intermediate. It is also valuable as a cross-linking agent, having the desirable property of being fairly stable under ordinary conditions and yet being active when used with readily polymerizable materials, such as styrene, vinyl esters, or acrylic acids, or mixtures of polymerizable vinylidene compounds.

Example 5

Tris(1-methyl-1-hydroxyethyl)benzene was prepared as in Example 1. There were then mixed 84 parts by weight of it and two parts of phosphoric acid. The mixture was heated at 110°–115° C. with the pressure being reduced to two millimeters. Water was collected in a chilled trap. After 15 parts of water was collected, the reaction mixture was washed with a 5% sodium bicarbonate solution and with water. It was dried over soluble anhydrite and distilled. The fraction collected at 100°–130° C./1–2 mm. was tris(1-methyl-1-hydroxyethyl)benzene in 55% yield.

*Example 6*

The procedure of Example 5 was followed, but 0.5 part of oxalic acid was substituted for the phosphoric acid. The tris(1-methyl-1-hydroxyethyl) benzene was collected in a yield of 60%.

In place of the various catalysts specifically shown above there may be used other acid catalysts, particularly those which have been generally recited above as suitable for use in the liquid phase dehydration. As there stated, this reaction is not confined to liquid phase and may be accomplished in vapor phase.

*Example 7*

In an apparatus comprising a flask connected to a heated tube containing activated alumina which in turn was connected to a receiver cooled with dry ice there was placed 84 parts by weight of 3-methyl-1-butyn-3-ol. The tube was heated to 250° C. The flask was heated to maintain a gentle rate of boiling of the alcohol therein. The product was collected and some of it was redistilled at 34°–36° C. The distillate was quite pure isopropenylacetylene, having a refractive index, $n_D^{20}$, of 1.4160. It should be remarked that it is not necessary to redistill the initial product, as it may be used directly for trimerizing. Distillation of the resulting tris(isopropenyl)benzene gives a final product of excellent purity.

*Example 8*

There were mixed 22 parts of the above distilled isopropenylacetylene, 1 part of the catalyst $Ni(CO)_2.[(C_6H_5)_3P]_2$, and 100 parts of benzene. The mixture was heated under reflux with the temperature finally carried to 80° C. The reaction mixture was left standing until cool. The liquid was decanted from a small amount of slude. It was treated with two parts of hydroquinone and distilled. The fraction collected at 110°–150° C./1 mm. was identified as tris(isopropenyl)benzene.

Repetition of the above procedure with the isopropenylacetylene as obtained from vapor phase dehydration led to the same product in similar yield.

We claim:

1. The process of preparing 1,3,5-trisisopropenylbenzene which comprises trimerizing 3-methyl-1-butyn-3-ol by heating it in the presence of a catalyst of the formula $Ni(CO)_{4-x}.[(C_6H_5)_3P]_x$ wherein $x$ is a number from one to two and dehydrating the resulting trimer by heating it in the presence of a dehydrating catalyst.

2. The process of preparing 1,3,5-trisisopropenylbenzene which comprises trimerizing 3-methyl-1-butyn-3-ol by heating it at 40° to 120° C. in the presence of a catalyst of the formula $Ni(CO)_{4-x}.[(C_6H_5)_3P]_x$ wherein $x$ is a number from one to two, whereby tris(1-methyl-1-hydroxyethyl)benzene is formed, and dehydrating said product by heating it at 80°–120° C. in the presence of an acid catalyst.

3. The process of preparing 1,3,5-trisisopropenylbenzene from 3-methyl-1-butyn-3-ol which comprises the steps of dehydrating by heating at 80°–120° C. in the presence of an acid catalyst and of trimerizing by heating at 40° to 120° C. in the presence of a catalyst of the formula $Ni(CO)_{4-x}.[(C_6H_5)_3P]_x$ wherein $x$ is a number from one to two.

4. As a new chemical substance, 1,3,5-trisisopropenylbenzene.

CHARLES H. McKEEVER.
JOHN O. VAN HOOK.

No references cited.

Disclaimer 2,542,551.—*Charles H. McKeever*, Glenside, and *John O. Van Hook*, Roslyn, Pa. 1,3,5-TRIS(ISOPROPENYL) BENZENE. Patent dated Feb. 20, 1951. Disclaimer filed July 19, 1951, by the assignee, *Rohm & Haas Company*.

Hereby enters this disclaimer to claim 4 of said patent.

[*Official Gazette September 4, 1951.*]